(12) United States Patent
Fochtman et al.

(10) Patent No.: US 6,422,488 B1
(45) Date of Patent: **\*Jul. 23, 2002**

(54) COMPRESSED NATURAL GAS INJECTOR HAVING GASEOUS DAMPENING FOR ARMATURE NEEDLE ASSEMBLY DURING CLOSING

(75) Inventors: James P. Fochtman, Williamsburg; Danny O. Wright, Cobbs Creek; James H. Cohen, Virginia Beach, all of VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/370,852

(22) Filed: Aug. 10, 1999

(51) Int. Cl.⁷ .............................................. F02M 51/00
(52) U.S. Cl. ................ 239/585.5; 239/585.1; 251/129.15
(58) Field of Search .................... 239/585.1, 585.2, 239/585.3, 585.4, 585.5, 5; 251/129.15

(56) References Cited

U.S. PATENT DOCUMENTS

| | | | |
|---|---|---|---|
| 2,291,968 A | 8/1942 | Keefe ........................ | 175/336 |
| 3,662,987 A | 5/1972 | Schlagmuller et al. ...... | 251/139 |
| 3,731,881 A | 5/1973 | Dixon et al. ................ | 239/585 |
| 3,937,855 A | 2/1976 | Gruenwald .................. | 427/54 |
| 4,331,317 A | * 5/1982 | Kamai et al. | |
| 4,586,017 A | 4/1986 | Laskaris et al. .......... | 338/32 S |
| 4,662,567 A | * 5/1987 | Knapp | |

(List continued on next page.)

FOREIGN PATENT DOCUMENTS

GB 2 044 986 10/1980

Primary Examiner—William C. Doerrler
Assistant Examiner—Christopher Kim (57) ABSTRACT

An electromagnetically operable fuel injector for a gaseous fuel injection system of an internal combustion engine, the injector having a generally longitudinal axis, which includes a ferromagnetic core, a magnetic coil at least partially surrounding the ferromagnetic core and an armature magnetically coupled to the magnetic coil and being movably responsive to the magnetic coil. The armature actuates a valve closing element in the form of a valve needle which interacts with a fixed valve seat of a fuel valve and is movable away from the fixed valve seat when the magnetic coil is excited. The fixed valve seat defines an aperture of predetermined dimension for passage of fuel therethrough, the armature having a generally elongated shape and a generally central opening for axial reception and passage of gaseous fuel from a fuel inlet connector positioned adjacent thereto. The fuel inlet connector and the armature are adapted to permit a first flow path of gaseous fuel between the armature and the magnetic coil as part of a path leading to said fuel valve. An orifice device is positioned downstream of the fuel valve and defines an orifice for reception of fuel from the fuel valve, the orifice being of lesser dimension than the aperture of said fixed valve seat. A method of directing gaseous fuel through an electromagnetically openable fuel injector in a manner which provides dampening of the valve needle upon closing is also disclosed.

14 Claims, 6 Drawing Sheets

U.S. PATENT DOCUMENTS

| | | | | |
|---|---|---|---|---|
| 4,688,723 A | | 8/1987 | Kern et al. | 239/391 |
| 4,693,227 A | | 9/1987 | Satou | 123/575 |
| 4,783,009 A | | 11/1988 | Coates | 239/580 |
| 4,909,447 A | | 3/1990 | Gallup et al. | 239/585 |
| 4,922,862 A | | 5/1990 | Casacci | 123/1 A |
| 4,946,107 A | | 8/1990 | Hunt | 239/585 |
| 4,978,074 A | | 12/1990 | Weinand | 239/585 |
| 4,988,967 A | | 1/1991 | Miller et al. | 335/279 |
| 5,025,554 A | | 6/1991 | Dohi | 29/860 |
| 5,033,716 A | * | 7/1991 | Mesenich | |
| 5,035,360 A | | 7/1991 | Green et al. | 239/585 |
| 5,046,472 A | | 9/1991 | Linder | 123/533 |
| 5,092,305 A | | 3/1992 | King | 123/575 |
| 5,127,585 A | | 7/1992 | Mesenich | 239/585 |
| 5,129,381 A | | 7/1992 | Nakajima | 123/531 |
| 5,174,505 A | | 12/1992 | Shen | 239/417.3 |
| 5,232,167 A | * | 8/1993 | McCormick et al. | |
| 5,301,874 A | | 4/1994 | Vogt et al. | 239/585.4 |
| 5,341,994 A | | 8/1994 | Wakeman | 239/585.5 |
| 5,344,081 A | * | 9/1994 | Wakeman | |
| 5,381,966 A | | 1/1995 | Gernert et al. | 239/585.3 |
| 5,383,606 A | * | 1/1995 | Stegmaier et al. | |
| 5,494,223 A | | 2/1996 | Hall et al. | 239/585.5 |
| 5,494,224 A | | 2/1996 | Hall et al. | 239/585.5 |
| 5,566,920 A | | 10/1996 | Romann et al. | 251/129.21 |
| 5,609,304 A | | 3/1997 | Sasao | 239/585.4 |
| 5,613,640 A | | 3/1997 | Furuya et al. | 239/585.5 |
| 5,628,294 A | | 5/1997 | Krieckaert | 123/525 |
| 5,632,467 A | | 5/1997 | Just et al. | 251/129.21 |
| 5,678,767 A | | 10/1997 | Rahbar | 239/533.2 |
| 5,704,553 A | | 1/1998 | WieczoreK et al. | 239/585.1 |
| 5,730,367 A | | 3/1998 | Pace et al. | 239/408 |
| 5,735,253 A | | 4/1998 | Perotto et al. | 173/575 |
| 5,758,865 A | | 6/1998 | Casey | 251/129.21 |
| 5,785,251 A | | 7/1998 | Wood et al. | 239/417.3 |
| 5,794,860 A | | 8/1998 | Neumann | 239/585.5 |
| 5,860,601 A | | 1/1999 | Egizi | 239/533.12 |
| 5,915,626 A | | 6/1999 | Awarzamani et al. | 239/135 |
| 5,918,818 A | | 7/1999 | Takeda | 239/585.1 |
| 5,921,475 A | | 7/1999 | De Vries et al. | 239/585.4 |
| 5,927,613 A | | 7/1999 | KoyanagI et al. | 239/585.1 |
| 5,996,912 A | | 12/1999 | Ren et al. | 239/585.5 |
| 6,000,628 A | * | 12/1999 | Lorraine | |
| 6,003,791 A | | 12/1999 | Reiter | 239/575 |
| 6,027,050 A | | 2/2000 | Rembold et al. | 239/585.5 |

* cited by examiner

COMPRESSED NATURAL GAS INJECTOR HAVING GASEOUS DAMPENING FOR ARMATURE NEEDLE ASSEMBLY DURING CLOSING

BACKGROUND OF THE INVENTION

1. Field of the Invention

The present application relates to a compressed natural gas injector which provides armature needle dampening during closing of the fuel valve.

2. Description of the Related Art

Compressed natural gas (hereinafter sometimes referred to as "CNG") is becoming a common automotive fuel for commercial fleet vehicles and residential customers. In vehicles, the CNG is delivered to the engine in precise amounts through gas injectors, hereinafter referred to as "CNG injectors". The CNG injector is required to deliver a precise amount of fuel per injection pulse and maintain this accuracy over the life of the injector. In order to maintain this level of performance for a CNG injector, certain strategies are required to help reduce the effects of contaminants in the fuel.

Compressed natural gas is delivered throughout the country in a pipeline system and is mainly used for commercial and residential heating. While the heating systems can tolerate varying levels of quality and contaminants in the CNG, the tolerance levels in automotive gas injectors is significantly lower.

These contaminants, which have been acceptable for many years in CNG used for heating, affect the performance of the injectors to varying levels and will need to be considered in future CNG injector designs. Some of the contaminants found in CNG are small solid particles, water, and compressor oil. Each of these contaminants needs to be addressed in the injector design for the performance to be maintained over the life of the injector.

The contaminants can enter the pipeline from several sources. Repair, maintenance and new construction to the pipeline system can introduce many foreign particles into the fuel. Water, dust, humidity and dirt can be introduced in small quantities with ease during any of these operations. Oxides of many of the metal types found in the pipeline can also be introduced into the system. In addition, faulty compressors can introduce vaporized compressor oils which blow by the seals of the compressor and enter into the gas. Even refueling can force contaminants on either of the refueling fittings into the storage cylinder. Many of these contaminants are likely to reach vital fuel system components and alter the performance characteristics over the life of the vehicle.

In general, fuel injectors require extremely tight tolerances on many of the internal components to accurately meter the fuel. For CNG injectors to remain contaminant tolerant, the guide and impact surfaces for the armature needle assembly require certain specifically unique characteristics.

In addition to fuel contamination problems using CNG, the fuel injectors inherently present additional problems. For example, the problems inherent to dampening or lack of dampening of the needle/armature assembly upon closing as well as upon opening of the fuel valve are unique to fuel injectors utilizing CNG.

The CNG injector is required to open and close very quickly. This quick closing creates a relatively severe impact between the armature and the seat. In the CNG injector, the factors which affect impact velocity between the armature and inlet connector are more severe than in a gasoline injector. The CNG injector has high lift, and lower viscosity (CNG) fluid when compared with a gasoline injector.

A CNG injector requires much higher flow area to get the same amount of energy flow through the injector during a given pulse. This is caused by the lower density of the gaseous CNG when compared to standard liquid fuels such as gasoline. This requires that the lift for a CNG injector valve needle be greater than that of a standard gasoline injector.

The increased lift creates two problems. First, the increased lift increases the amount of energy stored in the spring. This high potential energy stored in the spring is required to allow the injector to operate consistently as the viscosity of the fuel changes. Second, the velocity reached during the longer flight times can be high, creating higher impact forces. We have invented a fuel injector which incorporates a flow restricting orifice device which assists in dampening of the armature/needle assembly upon closing in a manner which improves performance of the engine, particularly when utilized in a fuel injector having several fuel flow paths therethrough, a feature which avoids the problems inherent with contaminated compressed natural gaseous fuels.

SUMMARY OF THE INVENTION

An electromagnetically operable fuel injector for a gaseous fuel injection system of an internal combustion engine is disclosed, the injector having a generally longitudinal axis, which comprises a ferromagnetic core, a magnetic coil at least partially surrounding the ferromagnetic core, and an armature magnetically coupled to the magnetic coil and being movably responsive to the magnetic coil. The armature actuates a valve closing element which interacts with a fixed valve seat of a fuel valve and is movable away from the fixed valve seat when the magnetic coil is excited. The fixed valve seat defines an aperture of predetermined dimension for passage of fuel therethrough. The armature has a generally elongated shape and a generally central opening for axial reception and passage of gaseous fuel from a fuel inlet connector positioned adjacent thereto. The fuel inlet connector and the armature are adapted to permit a first flow path of gaseous fuel between the armature and the magnetic coil as part of a path leading to the fuel valve. An orifice device is positioned downstream of the fuel valve and defines an orifice for reception of fuel from the fuel valve, the orifice being of lesser dimension than the aperture of the fixed valve seat.

In a preferred embodiment, an electromagnetically operable fuel injector for a compressed natural gas fuel injection system of an internal combustion engine is disclosed, the injector having a generally longitudinal axis, which comprises a ferromagnetic core, a magnetic coil at least partially surrounding the ferromagnetic core, and an armature coupled to the magnetic coil and movably responsive to the magnetic coil, the armature having a first upper end face and a lower end portion. A valve closing element is connected to the lower end portion of the armature and is interactive with a fixed valve seat which defines a fuel passage aperture to selectively permit fuel to pass through the aperture as the valve closing element is moved to a valve open position by the armature. An orifice device is positioned adjacent and downstream of the fuel valve, the orifice device having an orifice in general alignment with the fuel passage aperture and being dimensioned less than the aperture to restrict the flow of fuel from the fuel valve to thereby provide dampening of the valve closing element upon closing. A fuel inlet connector extends in a generally longitudinal direction above the armature and defines a path for fuel to enter the fuel inlet connector to be directed toward the armature, the fuel inlet connector having a lowermost end portion having a lowermost surface spaced above the armature to define a working gap through which the armature is movable. The armature has a fuel reception portion for receiving fuel directed from the fuel inlet connector. The armature further defines a generally axial fuel passage and at least a first fuel flow aperture extending through a wall portion thereof for directing fuel from the fuel inlet connector through the generally axial fuel passage and into the aperture toward the fixed valve seat for entry into an air intake manifold for the engine. The fuel flow aperture is oriented generally transverse to the longitudinal axis.

A method of directing gaseous fuel through an electromagnetically operable fuel injector for a fuel system of an internal combustion engine is also disclosed, the injector having a generally longitudinal axis, and including a fuel inlet end portion and a fuel outlet end portion, a fuel inlet connector positioned at the fuel inlet end portion and having a fuel inlet end portion. An armature is positioned adjacent the fuel outlet end portion of the fuel inlet connector, the armature being spaced from the fuel inlet connector to define a working gap to permit movement of the armature toward and away from the fuel inlet connector to selectively open and close a fuel valve by providing upward and downward movement of a valve closing element to selectively permit gaseous fuel to pass therethrough to an air intake manifold. The method comprises directing the gaseous fuel to pass axially through the fuel inlet connector, directing the gaseous fuel to pass from the fuel inlet connector to the generally elongated central opening of the armature in an axial direction toward the fuel valve, and restricting the passage of fuel exiting from the fuel valve so as to provide dampening of the valve closing element upon closing of the fuel.

BRIEF DESCRIPTION OF THE DRAWINGS

Preferred embodiments of the invention are described herein below with reference to the drawings wherein.

DESCRIPTION OF THE PREFERRED EMBODIMENTS

Figure 1:
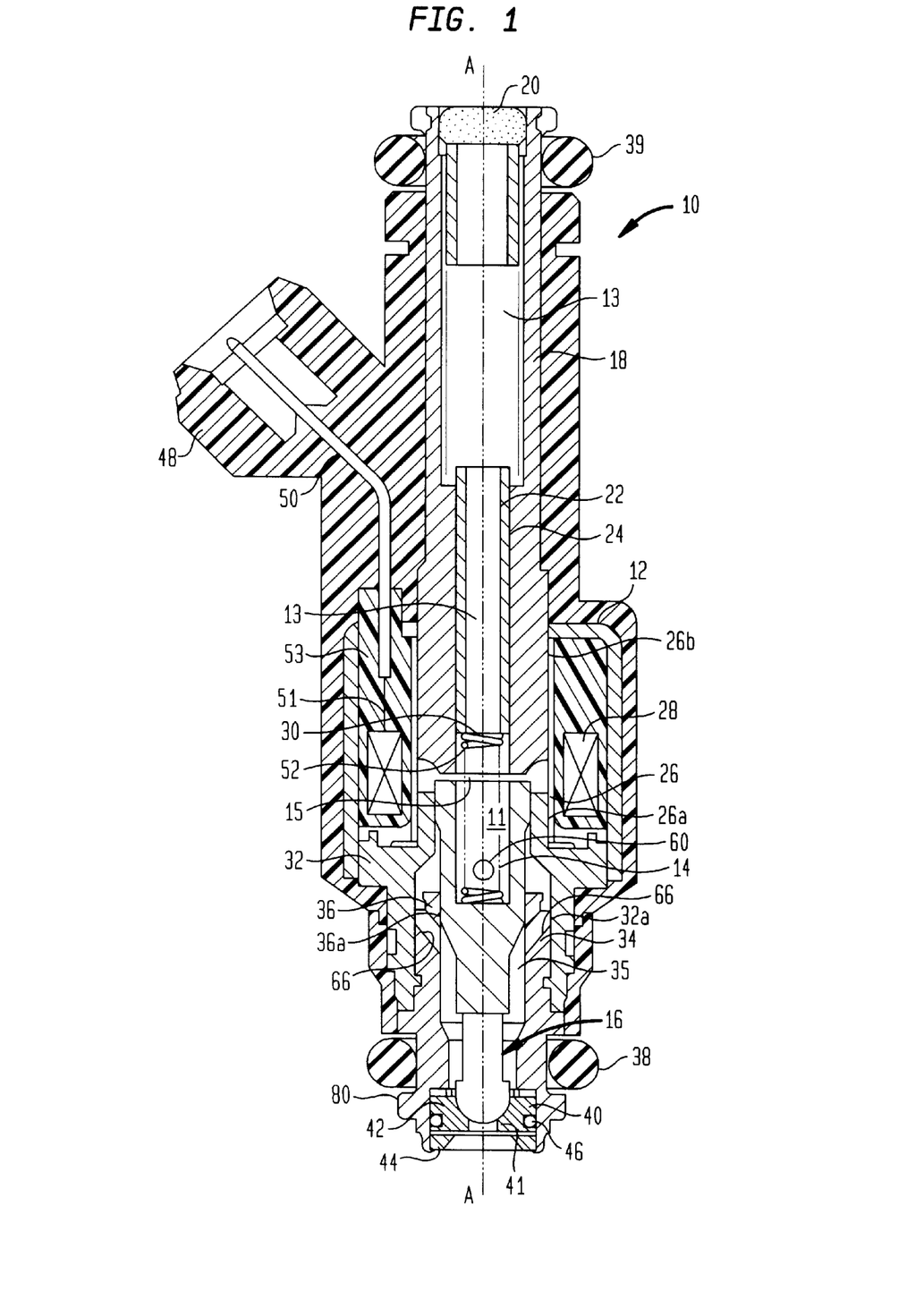
FIG. 1 is an elevational view, partially in cross-section, of a compressed natural gas injector of the type contemplated herein.
Figure 2:
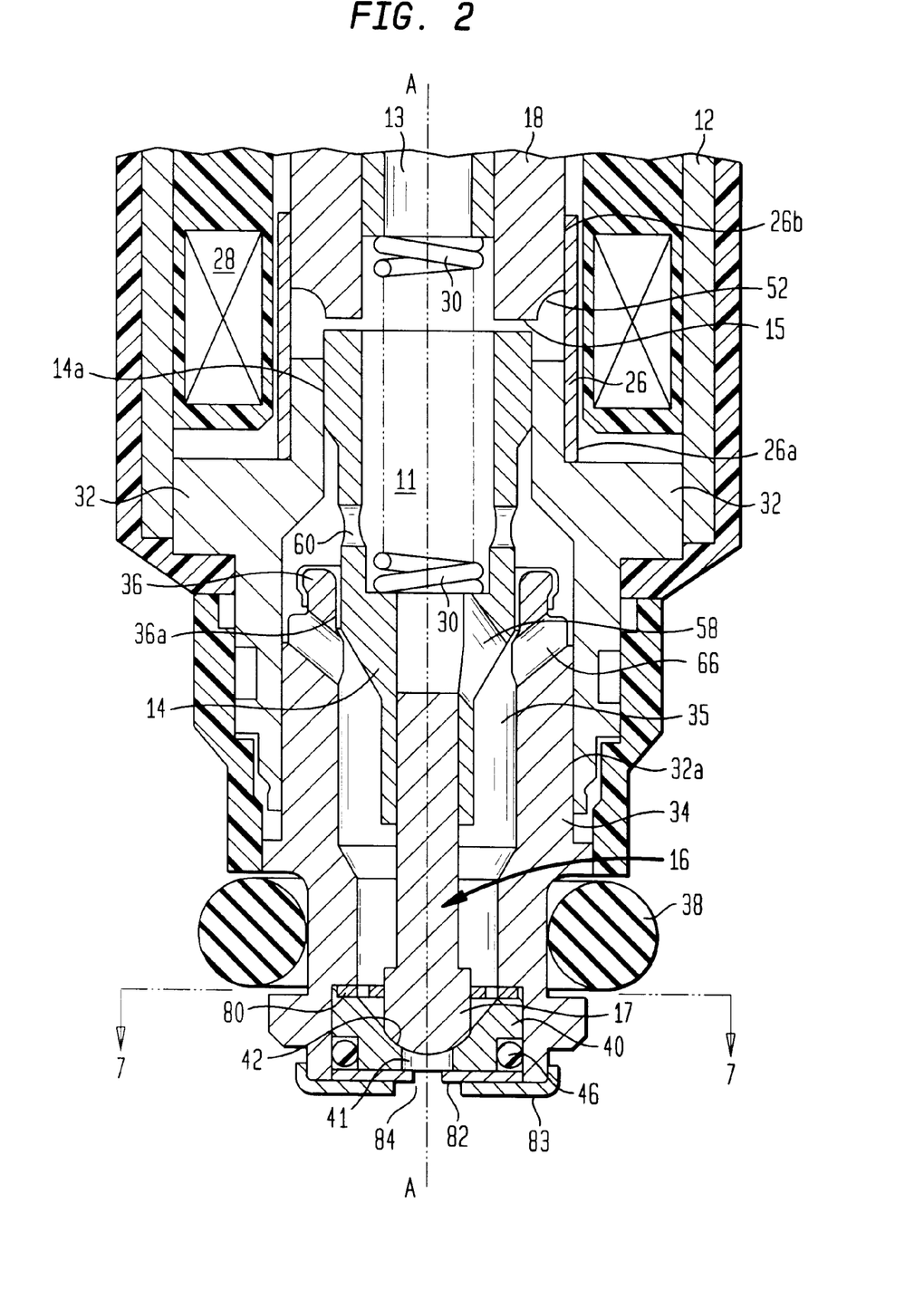
FIG. 2 is an enlarged elevational cross-sectional view of the lower portion of the injector of FIG. 1, modified to incorporate a flow restricting orifice device downstream of the fuel valve according to the present invention, other features being the same as in FIG. 1.

Referring initially to FIG. 1 there is shown a CNG injector 10 of the type contemplated herein for incorporation of a flow restricting orifice device according to the present invention as will be shown and described particularly in connection with FIG. 2. Injectors of the type contemplated herein are described in commonly assigned U.S. Pat. No. 5,494,224, the disclosure of which is incorporated by reference herein. Injectors of this type as also disclosed in commonly assigned copending applications; U.S. application Ser. No. 09/320,178, filed May 26, 1999, entitled Contaminant Tolerant Compressed Natural Gas Injector and Method of Directing Gaseous Fuel Therethrough, pending, and U.S. application Ser. No. 09/320,176, filed May 26, 1999, entitled Compressed Natural Gas Injector Having Improved Low Noise Valve Needle, pending, the disclosures of which are incorporated herein by reference. Other commonly assigned, copending applications include U.S. application Ser. No. 09/320,177, filed May 26, 1999, entitled Compressed Natural Gas Injector with Gaseous Damping for Armature Needle Assembly During Opening, now allowed, U.S. application Ser. No. 09/320,175, field May 26, 1999, entitled Gaseous Injector with Columnated Jet Orifice Flow Directing Device, now allowed, and U.S. application Ser. No. 09/320,179, filed May 26, 1999, entitled Compressed Natural Gas Injector Having Magnetic Pole Face Flux Director, pending, the disclosures of which are also incorporated herein by reference.

The injector 10 includes housing 12 containing armature 14 to which valve needle 16 is attached by crimping in a known manner. Fuel inlet connector 18 includes central fuel flow opening 13 and CNG filter 20 at the upper end portion of opening 13 as shown. The fuel inlet connector 18 also includes adjusting tube 22 connected thereto at 24 by a known crimping procedure. Housing 12 includes inner non-magnetic shell 26 which surrounds the inlet connector 18 and armature 14 having central fuel flow opening 11 as shown. Armature 14 and fuel inlet connector 18 define with housing 12, an enclosure for solenoid coil 28 which is selectively energized to move armature 14 and needle 16 upwardly to open the valve aperture 41, and selectively deenergized to permit armature 14 and needle 16 to return to the "closed valve" position as shown, under the force of coil spring 30. Fuel flow into the injector begins at filter 20 and passes through fuel inlet connector 18, to armature 14, and ultimately to valve aperture 41 of valve seat 40 into the intake manifold of the engine (not shown). Valve seat 40 shown in FIG. 1 is a type which does not incorporate the flow restricting orifice device of the present invention. However in the fuel injector of the present invention as shown in FIG. 2, the remaining structural features shown in FIG. 1 are the same.

FIG. 2 illustrates an injector similar to the injector shown in FIG. 1, modified to include the flow restricting orifice device 82 downstream of the fuel valve 40 as shown, and retained by crimped retaining washer 83. Referring further to FIG. 2 in conjunction with FIG. 1, valve body shell 32, which is made of a ferromagnetic material and which forms part of a magnetic circuit, surrounds valve body 34 that has at the upper end, upper guide 36 as shown. Space 36a between upper guide 36 and armature 14 is about 0.010 to about 0.015 mm on the diameter, and permits guiding movement of armature 14. Lower O-rings 38 provide sealing between the injector 10 and the engine intake manifold (not shown) and upper O-rings 39 provide sealing between the injector 10 and the fuel rail (also not shown). Valve body 34 defines central fuel flow opening 35.

In FIG. 2, valve body shell 32 is attached to valve body 34, preferably by weld 32a, and at the upper end by weld 26a, to non-magnetic shell 26. Non-magnetic shell 26 is in turn welded to fuel inlet connector 18 at 26b. Thus, fuel flowing from fuel inlet connector 18 across working gap 15 must flow through the clearance space 14a between armature 14 and valve body shell 32 which is also provided to permit upward and downward movement of armature 14. The space 14a is approximately 0.10 to 0.30 mm on the diameter.

Referring again to FIGS. 1 and 2, valve seat 40 contains a valve orifice 41 and a funnel shaped needle rest 42 having a generally frusto-conical cross-sectional shape. In FIG. 1 the valve seat 40 is maintained in position by back-up washer 44 and sealed against fuel leakage with valve body 34 by O-ring 46.

The valve seat 40 constructed according to the invention is shown in FIG. 2, and includes flow restricting orifice device 82 which has orifice 84 of lesser diameter than valve aperture 41. Orifice device 82 is held in position by crimped back-up washer 83 as shown. Thus, orifice device 82 serves to restrict the gaseous fuel flow passing through fuel valve 40 to increase the fuel pressure between the tip 17 of needle 16 and orifice device 84 so as to dampen the downward movement of needle 16 during the "valve closing" portion of the armature/needle movement cycle. In general, aperture 41 of fuel valve 40 is circular and is in the range of about 1.9 to about 2.2 mm (millimeters), and orifice 84 of orifice device 82 is circular and is in the range of about 1 mm to about 1.8 mm (millimeters). Accordingly, the range of possible ratios of valve aperture 41 size to orifice size is in the range of about 1.06 to about 2.2.

Overmold 48 of suitable plastic material such as nylon supports terminal 50 which extends into coil 28 and is connected via connection 51 to provide selective energization of the coil to open the valve by raising the armature 14 and valve needle 16 against the force of spring 30. Solenoid coil 28 is surrounded by dielectric plastic material 53 as shown in FIGS.

In injectors of this type, the interface space 15 (or working gap 15) between the inlet connector and the armature is extremely small, i.e. in the order of about 0.3 mm (millimeters), and functions relatively satisfactorily to permit armature upward and downward movement with conventional fuels which are relatively free of contaminants such as water, solids, oils, or the like, particularly after passing through a suitable fuel filter. Accordingly, when the two surfaces surrounding space 15 are in such intimate contact that the atmosphere between them is actually displaced in relatively significant amounts, atmospheric pressures acting on the two members actually force the two surfaces together. Any liquid contaminant present at the armature/inlet connector interface would allow for the atmosphere to be displaced, thereby adversely affecting the full and free operation of the armature/needle combination.

As noted previously, the utilization of CNG with fuel injectors presents several problems certain of which are related to contaminants in the fuel and others of which are related to the flow characteristics of gaseous fuels as compared to liquid fuels. When known injectors, which functioned at relatively acceptable levels with relatively clean conventional fuels, are utilized with CNG without inventive structural modifications, impurities such as oil or water at the inlet connector/armature interface produced a force of about 16.5 Newtons holding the armature to the inlet connector. In comparison, the force provided by spring 30 is in the order of about 3 Newtons, thus fully explaining the erratic closing of the armature/valve needle when the fuel utilized with known injectors is CNG. In particular, the 16.5 Newton force holding the inlet connector and armature together is due to the fact that the fuel operating pressure within the injector is about 8 bar (i.e. 8 atmospheres) and this force of about 16.5 Newtons acts across the lower surface area of the inlet connector 18, which is about 21 square millimeters (i.e. $mm^2$). Thus a relatively minor slick of oil or other impurity within space 15 of a known injector will cause the inlet connector and the armature to become temporarily attached to each other, particularly due to the 8 bar pressure acting on the remaining surfaces of the inlet connector and armature. As noted, the tendency for the armature to become attached to the inlet connector results in erratic valve closing.

Figure 3:
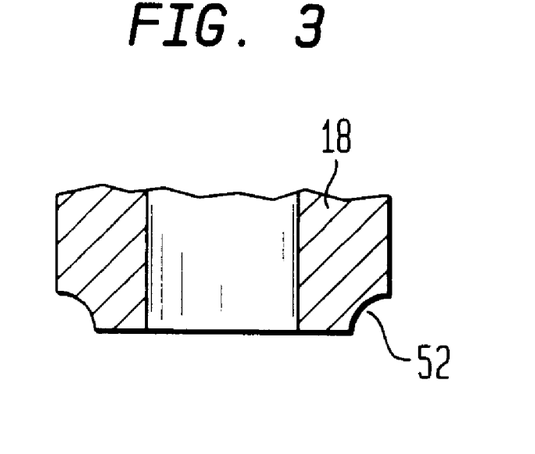
FIG. 3 is a partial elevational cross-sectional view of the lower end portion of the fuel inlet connector of the injector shown in FIG. 1, incorporating features to assist the injector in utilizing CNG.

Significant features of the present injector are provided inter alia, contribute toward elimination of the aforementioned erratic valve closing and improve the operation of the injector. In FIG. 3, the lower end portion of inlet connector 18 is configured as shown, by the arcuately chamfered end 52. This configuration provides a beneficial effect in that it directs and orients the magnetic field across the working gap 15 in a manner which optimizes the useful magnetic force created for moving the armature through the working gap 15 in a manner which optimizes the useful magnetic force created for moving the armature through the working gap. This feature is disclosed in commonly assigned application entitled Compressed Natural Gas Fuel Injector Having Magnetic Pole Face Flux Director, the disclosure of which is incorporated herein by reference.

Figure 4:
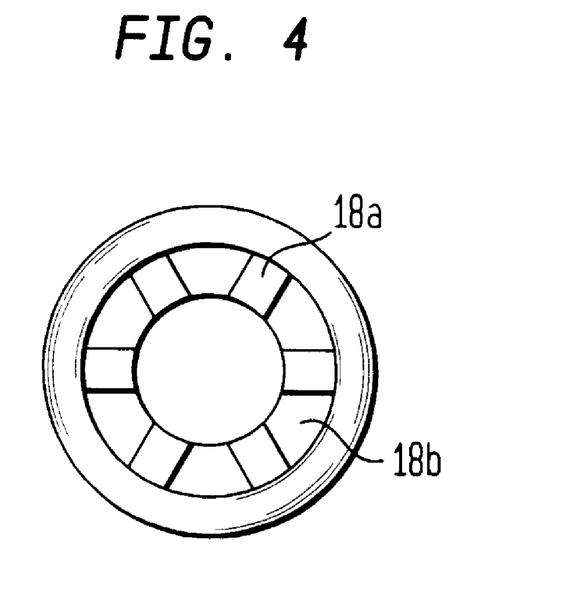
FIG. 4 is a plan view of the bottom surface of the preferred fuel inlet connector shown in FIGS. 1 and 2.

In addition, as shown in FIG. 4, radial slots in the form of recessed surfaces 18a are provided in the lowermost surface of inlet connector 18 to reduce the effective contact surface area between the armature and the inlet connector by about one third of the total cross-sectional area which was utilized in prior art conventional injectors. This configuration provides six coined pads 18b of about 0.05 mm in height, thus providing six corresponding generally rectangular shaped radial slots 18a to provide fuel flow paths. By reducing, the effective surface area of the lowermost face of the inlet connector 18 as shown, the tendency to develop an attractive force between the inlet connector 18 and the armature 14, is significantly reduced to about one-third of its original value, and the ability to tolerate fuel contaminants at the interface without producing an attractive force therebetween is also significantly increased. As noted, preferably, the rectangular radial slots 18a are of a shallow depth, i.e. about 0.05 mm, (i.e., millimeters) in order to provide the benefit of reducing the inlet connector/armature interface surface area while still providing a relatively unobtrusive location for temporary collection of solid contaminants which are ultimately removed by the flow for gaseous CNG.

As noted, the provision of recessed surfaces 18a in the lowermost surface of inlet connector 18 creates raised pads 18b on the surface, which pads improve the tolerance of the injector to fuel contaminants in several ways. The recessed surfaces 18a may be made by any suitable process, but are preferably coined. The first effect is to reduce the contact area of the inlet connector at the armature interface, thereby significantly reducing any attractive force generated therebetween by liquid contaminants such as oil or water. Furthermore, as noted, the radial pads 18b provide hidden areas between the pads where contaminants can collect without affecting the operative working gap 15 until being drawn away by the fuel flow. The working gap for gasoline is about 0.08 mm to about 0.14 mm and about 0.3 mm for compressed natural gas. In addition, as noted, the provision of the six rectangular recessed portions in the form of slots 18a and six raised pads 18b, each having a generally trapezoidal shape, on the inlet connector, provides a unique fuel flow path past the inlet connector/armature interface in a manner which causes the gaseous fuel to pass transversely through the working gap 15 as shown at 56 in FIG. 5 and allow for the control of the fuel flow around and through the armature by controlling the pressure losses.

Also by controlling the sizes of the recessed surfaces 18a and raised pads 18b, and the various apertures 58, 60, 66 in the armature and the valve body as will be described—as well as the numbers and combinations of such openings—the fuel flow can be controlled over at least three flow paths and pressure losses can also be controlled. For example, a small pressure differential across the armature while fully open, assists spring 30 during breakaway upon closing and provides dampening on opening impact. The additional fuel flow path also reduces the possibility of contaminants collecting above upper guide 36 as shown in FIG. 2. In summary, numerous combinations of apertures and sizes thereof—as well as slots and pads on the fuel inlet connector—can be made to direct the gaseous fuel flow in any desired manner which is best for optimum fuel burning and engine application.

Figure 5:
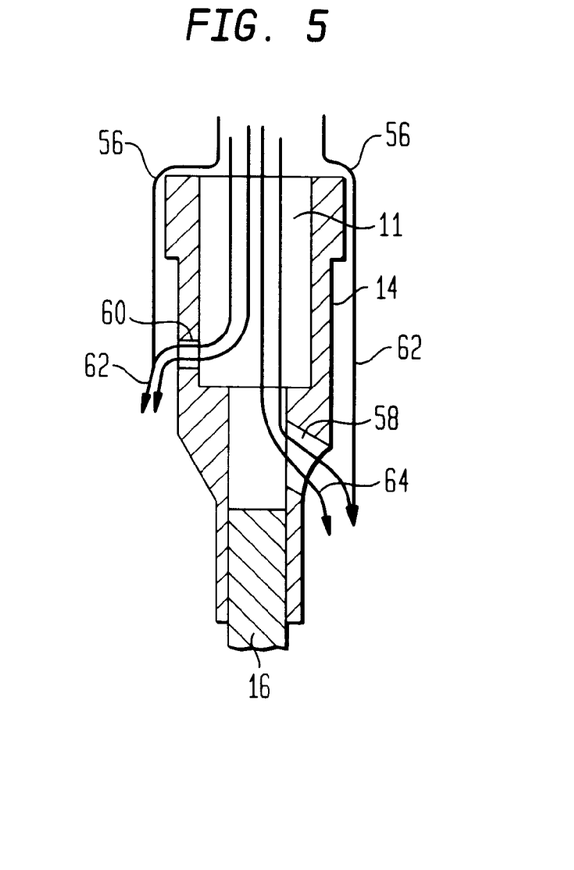
FIG. 5 is an elevational cross-sectional view of a preferred embodiment of the armature shown in FIGS. 1 and 2, illustrating fuel flow paths resulting therefrom.
Figure 6:
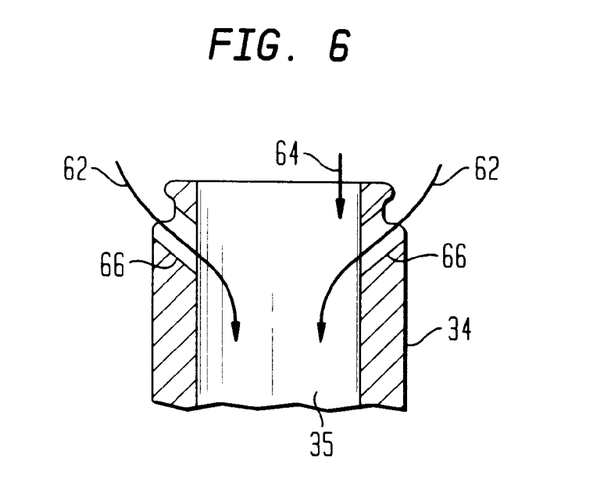
FIG. 6 is an elevational cross-sectional view of the upper portion of the valve body shown in FIGS. 1 and 2.

Referring now to FIGS. 5 and 6 in conjunction with FIGS. 1–3, there is illustrated a feature which renders the fuel injector assembly more fully capable of operation with CNG. In injectors which were used with relatively contaminant free liquid fuels the fuel would pass through the filter and down through the inlet connector into the armature and out an opening positioned relatively close to the lowest portion of the armature which was located substantially immediately above the valve aperture. In the present structure there is provided a relatively diagonally oriented aperture 58 shown in FIGS. 2 and 5, which directs the CNG flow therethrough and downwardly toward valve aperture 41 for entry into the intake manifold of the internal combustion engine.

As shown in FIG. 5, aperture 58 forms a generally acute angle with longitudinal axis A—A of the fuel injector 10. In addition, the armature of the present invention provides at least one side opening 60 which is generally transverse to the longitudinal axis A—A, to permit fuel flowing downwardly through the center of the armature to be directed sidewardly out of the armature and thereafter downwardly toward the valve aperture 41 shown in FIG. 1. In the embodiment shown in FIG. 1, aperture 60 is generally horizontal, but may be oriented at an acute angle to the longitudinal axis if desired. Aperture 58 is not shown in the cross-sectional view of FIG. 1. The fuel flowing through aperture 60 is indicated in FIG. 5 by the flow lines 62 and the fuel flowing through aperture 58 is indicated schematically by flow lines 64. Optionally several additional horizontal apertures 60 may be provided in the armature at different radial locations thereabout, or alternatively as shown, one aperture 60 may be provided, depending upon the fuel flow pattern sought in each particular instance. It can be seen that the fuel flow from the fuel inlet connector 18 is divided into three paths, a first path expanding across working gap 15, a second path through aperture(s) 60, and a third path through aperture(s) 58. The first path extends between the armature 14 and the magnetic coil 28 and is ultimately joined by the second flow path passing through aperture(s) 60.

It can also be readily appreciated that the diameters of each aperture 58, 60 can be varied to direct the fuel flow in any predetermined desired direction. For example, by reducing the size of apertures 58, 60 fuel will be encouraged to flow with increased volume cross the working gap 15. Alternatively, increasing the diameter of apertures 58, 60 will attract greater volume of fuel through those apertures and thereby reduce the fuel flow across the working gap. It has also been found that the diameters of the apertures 58, 60 and the numbers and locations of such apertures affect the dampening characteristics of the valve needle 16, both upon opening and upon closing. Accordingly, the diameter of fuel flow apertures 58, 60 and the numbers, locations, and orientations of such apertures will depend upon the desired volumetric flow characteristics and desired flow patterns in each instance; however diameters within the range of 1–2 mm have been found to be preferable.

Referring now to FIG. 6, a valve body 34 is also provided with central fuel flow opening 35 and several diagonally oriented fuel path apertures 66 which are intended to receive the CNG fuel flowing from the first and second flow paths from the working gap 15 and aperture(s) 60 along the sides of the armature 14 and to redirect the fuel downwardly toward the valve aperture 41. Thus, when the needle 16 is lifted, the fuel is permitted to enter aperture 41 and is thereafter directed into the intake manifold of the engine, which is not shown in the drawings. Fuel flowing along the third flow path through aperture(s) 58 lead directly toward aperture 41. It has been found that the unique provisions of the apertures 58 and 60—as well as rectangular radial slots 18a on the lowermost face of the inlet connector—create a fuel flow pattern which induces the CNG to flow in the manner shown by the fuel flow lines at 56, 62 and 64 in FIG. 5, and such fuel flow lines actually create ideal pressure conditions to avoid causing the armature to be attracted to the inlet connector. Thus the attractive forces between the armature 14 and inlet connector 18 are minimized by the several factors mentioned, namely the elimination of the tendency of the oil and contaminates to accumulate in the space 15 located between the armature and the inlet connector, the reduction of the effective inlet connector/armature interface area by the provision of radial pads on the face of the inlet connector, and the provision of the unique CNG flow pattern which creates a force free environment between the inlet connector and the armature.

As indicated, alternatively, apertures 60 may be provided in several locations about the circumference of the armature, and apertures 58 may be provided in several locations thereabout. Also their angular orientations may be varied. However, it has been found that a single aperture on each side, as shown, is sufficient to produce the desired flow path and the force free environment. Also, it should be noted that the diameter of each aperture can be altered in order to provide control of the fuel pressures and flow patterns in the areas surrounding the inlet connector, the armature, and the valve body, so as to provide a predetermined fuel flow pattern throughout the injector as may be desired. This feature is more fully disclosed in the aforementioned commonly assigned, copending applications entitled Compressed Natural Gas Injector Having Gaseous Damping for Armature Needle Assembly During Opening.

It should also be noted that the presence of the diagonally oriented fuel flow apertures 66 in valve body 34 eliminates the problems of prior art injectors wherein debris and contaminants would accumulate in the area of the upper valve guide 36, causing abrasive action and intermittent guidance between the upper guide 36 and the armature 14. Thus, the provision of the diagonally oriented apertures 66 in valve body 34 encourage the flow of CNG past the area surrounding the upper guide 36 and eliminate any accumulation tendencies for contaminants in the area of upper guide 36.

Figure 7:
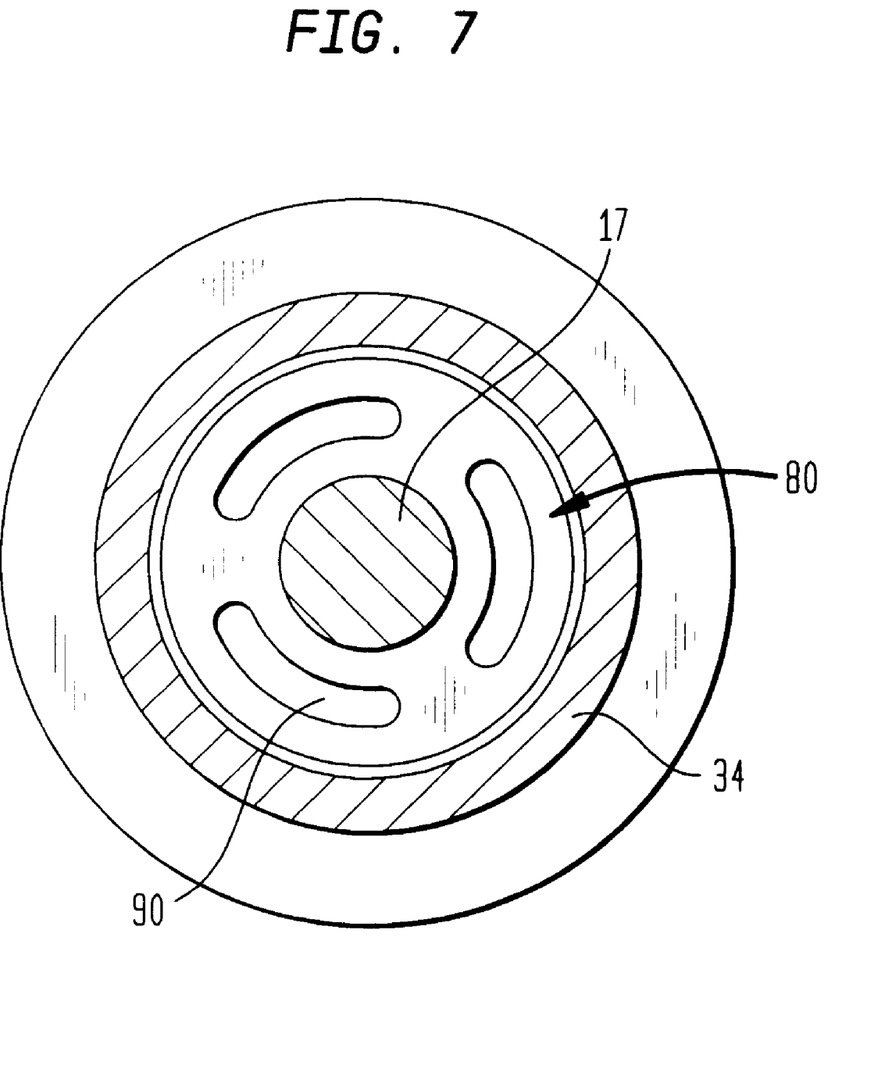
FIG. 7 is a view taken along lines 7—7 of FIG. 2, illustrating the lower valve needle guide.

Referring now to FIG. 7, in conjunction with FIG. 2, lower valve needle guide 80 is illustrated in the form of a disc shaped member having arcuately shaped fuel passage apertures 90 which direct the gaseous CNG toward valve aperture 41.

Figure 8:
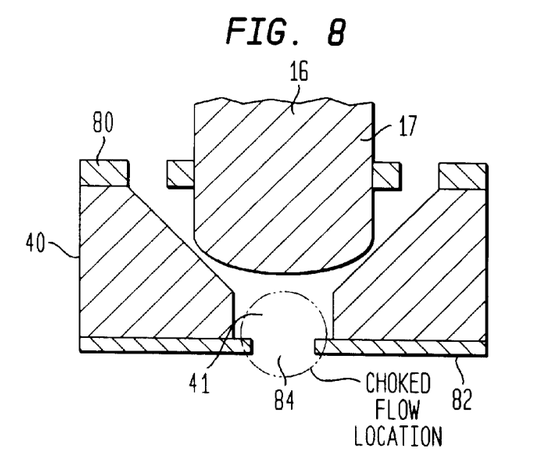
FIG. 8 is a cross-sectional view of the valve needle seat shown in FIG. 2, illustrating the flow restricting orifice according to the present invention, with the tip of the valve needle in the "valve open" position.
Figure 9:
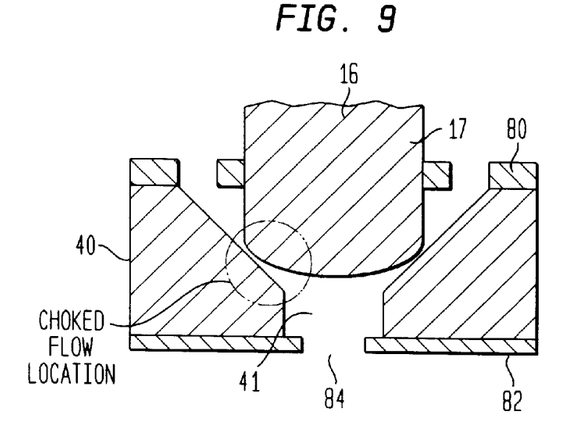
FIG. 9 is a cross-sectional view similar to FIG. 8, with the tip of the valve needle in the "nearly closed" position.
Figure 10:
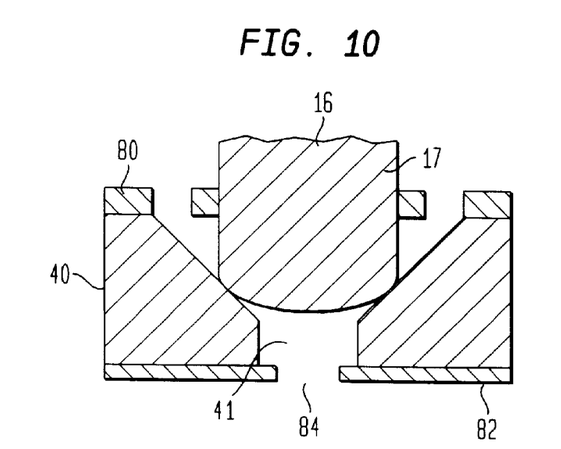
FIG. 10 is a cross-sectional view similar to FIG. 9, with the tip of the valve needle in the "valve closed" position.

The stages through which a CNG injector undergoes while closing begin with de-energizing of the solenoid coil and decay of the magnetic flux. Next, the magnetic force decays to a level less than the combined spring and gas force acting on the needle armature assembly, causing the needle armature to move toward the seat. As the valve needle approaches the valve seat, the gas flowing out of the injector is sealed at the needle seat interface and the injector valve closes. These three phases are characterized at the needle seat interface in the stages of closing which are illustrated in FIGS. 8, 9 and 10, respectively. In particular, FIG. 8 shows tip 17 of needle 16 in the open position, FIG. 9 shows needle tip 17 in the nearly closed position, and FIG. 10 shows needle tip 17 in the fully closed position.

To exit the injector 10 the fuel passes through apertures 90 in the lower guide 80, and thereafter between the needle tip 17 and seat interface. The fuel then passes through the seat aperture 41 and exits through the orifice. When the injector is fully open, the CNG injector has sonic choked flow at the orifice 84. Choked flow will occur whenever the pressure drop is greater than 55% across any point in the system. In the present instance, the flow is choked at the orifice 84 of orifice device 82 while the injector needle 16 is fully open. Also, the flow is choked at the needle seat when the needle 16 is nearly closed.

When the CNG injector is fully closed as shown in FIG. 10, the needle return coil spring 30 accounts for about ¼ of the total force on the needle armature assembly. The other ¾ force is made up of the compressed gas forcing the needle into the seat caused by the differential pressure between the internal injector and the pressure in the intake manifold of the engine. To dampen the needle armature assembly during closing, the downward force on the needle 16 caused by the differential gas pressure is delayed by the presence of orifice device 82 for a short period of time when the injector is nearly closed.

As the needle approaches the valve seat 40 under the force of the coil spring 30, the sonic flow condition transfers from the orifice 84 to the needle seat interface. By controlling the duration of this transfer time the level of dampening can be varied. In particular, the time to transfer the sonic flow from the orifice to the needle/seat interface is controlled by the volume between the needle/seat interface and the orifice 84. The diameter of the orifice 84 also affects the transfer of the sonic flow condition. When the injector is open, fully established flow is choked at the orifice. Before the transfer of the choked flow from the orifice to the needle/seat interface can take place, a 55% pressure drop must occur at the needle/seat interface. In particular, the pressure must decay in the region between the needle/seat interface and the orifice 84. Before the pressure in this region decays, the coil spring 30 has the most influence on the velocity of the needle/armature assembly. Once the flow is choked at the needle/seat interface, the additional force to close the injector valve is provided by the differential gas pressure acting on the needle 16.

Although the invention has been described in detail with reference to the illustrated preferred embodiments, variations and modifications may be provided within the scope and spirit of the invention as described and as defined by the following claims.

What is claimed is:

1. An electromagnetically operable fuel injector for a gaseous fuel injection system of in internal combustion engine, said injector having a generally longitudinal axis, the electromagnetically operable fuel injector comprising:

a) a magnetic coil;

b) an armature magnetically coupled to said magnetic coil and being movably responsive to said magnetic coil, said armature actuating a valve closing element which interacts with a fixed valve seat of a fuel valve and being movable away from said fixed valve seat when said magnetic coil is excited, said fixed valve seat defining an aperture of predetermined dimension for passage of fuel therethrough, said armature having a generally elongated shapes a generally central opening for axial reception and passage of gaseous fuel from a fuel inlet connector positioned adjacent thereto, and at least one first fuel flow aperture extending through a wall portion of said armature, said fuel inlet connector and said armature being adapted to permit a first flow path of gaseous fuel between said armature and said magnetic coil and adapted to permit a second flow path of gaseous fuel from the central opening through the at least one first fuel flow aperture;

c) a valve body surrounding and guiding said armature, said valve body having at least one aperture in a wall portion thereof for receiving said first flow path of gaseous fuel, said second flow path of gaseous fuel bypassing said at least one aperture; and d) an orifice device positioned downstream of said fuel valve defining an orifice for reception of fuel from said fuel valve, said orifice being of lesser dimension than said aperture of said fixed valve seat.

2. The electromagnetically operable fuel injector according to claim 1, wherein said armature defines at least one second fuel flow aperture in the wall portion thereof to define a third flow path of gaseous fuel.

3. The electromagnetically operable fuel injector according to claim 2, wherein said at least one second fuel flow aperture is oriented generally transversely with respect to the longitudinal axis.

4. If The electromagnetically operable fuel injector according to claim 3, wherein said fuel inlet connector and said armature are spaced to define a working gap therebetween and are adapted to permit said first flow path of gaseous fuel within said working gap.

5. The electromagnetically operable fuel injector according to claim 1, further comprising a valve body shell at least partially surrounding said armature and said valve body, said valve body shell defining a radial space with said armature for passage of said first flow path of gaseous fuel between said armature and said valve body shell.

6. The electromagnetically operable fuel injector according to claim 5, wherein said fuel inlet connector is positioned above said armature and is spaced from said armature by a working gap, said fuel inlet connector defining a through passage for directing fuel toward said armature and said fixed valve seat.

7. An electromagnetically operable fuel injector for a gaseous fuel injection system of an internal combustion engine, said injector having a generally longitudinal axis, the electromagnetically operable fuel injector comprising:

a) a magnetic coil;

b) an armature magnetically coupled to said magnetic coil and being movably responsive to said magnetic coil, said armature actuating a valve closing element which interacts with a fixed valve seat of a fuel valve and being movable away from said fixed valve seat when said magnetic coil is excited, said fixed valve seat defining an aperture of predetermined dimension for passage of fuel therethrough, said armature having a generally elongated shape and a generally central opening for axial reception and passage of gaseous fuel, said armature being adapted to permit a first flow path of gaseous fuel between said armature and said magnetic coil as part of a path leading to said fuel valve;

c) an orifice device positioned downstream of said fuel valve defining an orifice for reception of fuel from said fuel valve, said orifice being of lesser diameter than a diameter of said aperture of said fixed valve seat, a ratio of said diameter of said aperture of said fixed valve seat to the diameter of said orifice is from about 1.06 to about 2.2; and d) a fuel inlet connector including an upper end portion adapted for reception of gaseous fuel from a fuel source, and a lower end portion for discharging gaseous fuel to said armature, said lower end portion having a lower surface which faces an upper surface of said armature, said lower surface of said fuel inlet connector having a plurality of radially extending raised pads defined thereon, said pads having recessed portions therebetween to permit fuel to flow therethrough and across a working gap defined between said fuel inlet connector and said armature.

8. An electromagnetically operable fuel injector for a compressed natural gas fuel injection system of an internal combustion engine, said injector having a generally longitudinal axis, the electromagnetically operable fuel injector comprising:

a) a magnetic coil;

b) an armature coupled to said magnetic coil and movably responsive to said magnetic coil, said armature having a first upper end face and a lower end portion;

c) a valve closing element connected to said lower end portion of said armature and interactive with a fixed valve seat defining a fuel passage aperture to selectively permit fuel to pass through said aperture as said valve closing element is moved to a valve open position by said armature;

d) an orifice device positioned adjacent and downstream of said fuel valve, said orifice device having an orifice in general alignment with said fuel passage aperture and being dimensioned less than said aperture to restrict the flow of fuel from said fuel valve to thereby provide dampening of said valve closing element upon closing;

e) a fuel inlet connector extending in a generally longitudinal direction above said armature and defining a path for fuel to enter said fuel inlet connector and to be directed toward said armature, said fuel inlet connector having a lowermost end portion having a lowermost surface spaced above said armature to define a working gap through which said armature is movable;

f) said armature having a fuel reception portion for receiving fuel directed from said fuel inlet connector, said armature further having first and second fuel flow apertures extending through a wall portion thereof for directing fuel from said fuel reception portion toward said fixed valve seat for entry into an air intake manifold for the engine, said first fuel flow aperture being oriented generally transverse to said longitudinal axis and said second fuel flow aperture being oriented at a generally acute angle with respect to said longitudinal axis; and g) a valve body surrounding and guiding said armature, said valve body having at least one aperture in a wall portion thereof for receiving fuel directed through said first fuel flow aperture, said fuel directed through said second fuel flow aperture bypassing said at least one aperture.

9. The electromagnetically operable fuel injector according to claim 8, wherein said lowermost surface of said fuel inlet connector and said armature are adapted to permit gaseous fuel to flow across said working gap and between said armature and said magnetic coil whereby at least three fuel flow paths are permitted.

10. An electromagnetically operable fuel injector for a compressed natural gas fuel injection system of an internal combustion engine, said injector having a generally longitudinal axis, the electromagnetically operable fuel injector comprising:

a) a magnetic coil;

b) an armature coupled to said magnetic coil and movably responsive to said magnetic coil, said armature having a first upper end face and a lower end portion;

c) a valve closing element connected to said lower end portion of said armature and interactive with a fixed valve seat defining a fuel passage aperture to selectively permit fuel to pass through said aperture as said valve closing element is moved to a valve open position by said armature;

d) an orifice device positioned adjacent and downstream of said fuel valve, said orifice device having an orifice in general alignment with said fuel passage aperture and being dimensioned less than said aperture to restrict the flow of fuel from said fuel valve to thereby provide dampening of said valve closing element upon closing;

e) a fuel inlet connector extending in a generally longitudinal direction above said armature and defining a path for fuel to enter said fuel inlet connector and to be directed toward said armature, said fuel inlet connector having a lowermost end portion having a lowermost surface spaced above said armature to define a working gap through which said armature is movable, said lowermost end portion has a generally chamfered configuration along the lowermost outer surface thereof, the generally chamfered portion having a generally arcuate cross-section; and f) said armature having a fuel reception portion for receiving fuel directed from said fuel inlet connector, said armature further defining a generally axial fuel passage and at least a first fuel flow aperture extending through a wall portion thereof for directing fuel from said fuel inlet connector through said generally axial fuel passage and into said aperture toward said fixed valve seat for entry into an air intake manifold for the engine, said fuel flow aperture being oriented generally transverse to said longitudinal axis.

11. The electromagnetically operable fuel injector according to claim 10, wherein said valve closing element is a valve needle adapted for selective engagement and disengagement with said fixed valve seat.

12. The electromagnetically operable valve according to claim 11, wherein said fuel inlet connector includes a lower surface portion having a plurality of radially extending grooves defining a corresponding plurality of radially extending raised pads so as to reduce the effective surface area of said lower surface portion of said fuel inlet connector facing said armature to thereby permit the gaseous fuel to flow generally transversely in said working gap, said transverse fuel flow thereby preventing accumulation of contaminants in said working gap.

13. The electromagnetically operable fuel injector according to claim 12, wherein said generally radially extending pads have a generally trapezoidal shape.

14. The electromagnetically operable fuel injector according to claim 13, wherein said aperture of said fixed valve seat is circular and is dimensioned between about 1.9 and about 2.2 millimeters, and said orifice of said orifice device is circular and is dimensioned between about 1 and about 1.8 millimeters.

* * * * *